(12) United States Patent
Aberl et al.

(10) Patent No.: US 7,159,138 B2
(45) Date of Patent: Jan. 2, 2007

(54) METHOD AND APPARATUS FOR DATA TRANSFER BETWEEN AT LEAST TWO MODULES INTERCONNECTED BY A SERIAL DATA BUS

(75) Inventors: Peter Aberl, Kranzberg (DE); Ralf Eckhardt, Wiesbaden (DE)

(73) Assignee: Texas Instruments Incorporated, Dallas, TX (US)

( * ) Notice: Subject to any disclaimer, the term of this patent is extended or adjusted under 35 U.S.C. 154(b) by 452 days.

(21) Appl. No.: 10/286,046

(22) Filed: Nov. 1, 2002

(65) Prior Publication Data

US 2003/0088719 A1  May 8, 2003

(30) Foreign Application Priority Data

Nov. 2, 2001  (DE) .............................. 101 53 862

(51) Int. Cl.
*G06F 1/12*  (2006.01)
(52) U.S. Cl. .................. 713/600; 713/401; 713/500
(58) Field of Classification Search ................ 713/600, 713/401, 500, 400
See application file for complete search history.

(56) References Cited

U.S. PATENT DOCUMENTS

| | | | | |
|---|---|---|---|---|
| 4,415,984 A | * | 11/1983 | Gryger et al. ............... | 713/401 |
| 4,908,838 A | * | 3/1990 | Mizoguchi ................... | 375/235 |
| 5,634,042 A | * | 5/1997 | Kashiwagi et al. .......... | 713/501 |
| 5,680,596 A | * | 10/1997 | Iizuka et al. ................. | 713/600 |
| 5,835,736 A | * | 11/1998 | Maeda et al. ................ | 713/600 |
| 5,911,062 A | * | 6/1999 | Taki ............................ | 713/400 |
| 5,919,265 A | | 7/1999 | Nishtala et al. | |
| 6,041,417 A | * | 3/2000 | Hammond et al. .......... | 713/400 |
| 6,259,293 B1 | * | 7/2001 | Hayase et al. ............... | 327/276 |
| 6,415,325 B1 | * | 7/2002 | Morrien ....................... | 709/230 |
| 6,560,716 B1 | * | 5/2003 | Gasparik et al. ............. | 713/600 |
| 6,715,096 B1 | * | 3/2004 | Kuge ............................ | 713/600 |

FOREIGN PATENT DOCUMENTS

DE   37 21 897 A1   7/1987

* cited by examiner

*Primary Examiner*—Thuan Du
(74) *Attorney, Agent, or Firm*—Robert D. Marshall, Jr.; W. James Brady; Frederick J. Telecky, Jr.

(57) ABSTRACT

Method and apparatus for serial data transfer between at least two modules (10, 12) connected to each other by way of a serial data bus (18) where the data transfer is governed by a clock signal (CLK). The modules (10, 12) each comprise a receiver unit (30) for the reception of the data and a transmitter unit (22) for the transmission of data. The output of a data value by the transmitter unit (22) of one module (12) to another module (10) at the serial data bus (18), and the import of the data value by the receiver unit (30) of the corresponding other module (10) are initiated by slopes of the clock signal (CLK). The clock signal that triggers the transmission of this data value in the one module (12) is delayed via a delay element (38) one pulse repetition period ($\Delta$TP) of the clock signal (CLK).

5 Claims, 2 Drawing Sheets

State of the Art

State of the Art

METHOD AND APPARATUS FOR DATA TRANSFER BETWEEN AT LEAST TWO MODULES INTERCONNECTED BY A SERIAL DATA BUS

This application claims priority of Germany Patent Application No. 10153862.6, filed on Nov. 2, 2001, in the Germany Patent Office and from which priority under 35 U.S.C. §119 is claimed for the above-identified application.

TECHNICAL FIELD OF THE INVENTION

The technical field of this invention is data transfer between at least two modules via a serial data bus.

BACKGROUND OF THE INVENTION

The invention relates to a procedure for the transfer of data between at least two modules, connected to each other by way of a serial data bus, under the control of a clock signal. Each module comprises a receiver unit for the reception of the data sent in each case from the other module and a transmitter unit for the transmission of data to another module. The output of a data value by the transmitter unit of one module to another module at the serial data bus, as well as the import of the data value into the receiver unit of the corresponding other module, is initiated by clock signal slopes. This invention further relates to a serial interface for the realization of the procedure.

Normally the modules are interconnected by a serial data dot-and-dash line. Currently used serial interfaces with 2 mA output buffers for both data and clock signals of the superset master modules and subset slave modules have capacitive loading at the output buffers that restricts the maximum bit rate FIG. 1 illustrates master module 10 and slave module 12 connected by dot-and-dash line 18. Assume for the purpose further explanation that the master module 10 is to receive a data value from the slave module 12. The path of the clock signal from the master module 10 to the slave module 12 is represented by a broken line 18. The path of the data signal from the slave module 12 to the master module 10 is represented by a dot-and-dash line 18. Master module 10 outputs a clock signal to the serial data bus by clock output buffer 14 and a clock signal output 16. The clock signal is received by slave module 12 by clock signal input 20 and is routed to transmitter unit 22 consisting of a register. The transmitter unit 22 then outputs a data value by data output buffer 24 and data signal output 26 to serial data bus 18. The data value enters receiver unit 30, consisting of a register, by data signal input 28 of master module 10. Thus transfer of the data value to this receiver unit 30 is controlled by the clock signal.

FIG. 2 illustrates the temporal relationship in each case and the resulting limitations with respect to the greatest possible bit rate. FIG. 2 illustrates the data transfer process as above-described in general terms with regard to its exact relation to the clock signal CLK. FIG. 2 shows the clock signal CLK (waveform A) internally generated within the master module 10 at the input of the clock output buffer 14. Waveform B is the clock signal output by clock output buffer 14. Waveform C is the data signal output at the data signal output 26 of the slave module 12.

FIG. 2 illustrates the data transfer process is initiated at leading edge 32, the so-called transmission edge. In this context it should be noted that a high clock signal value is recognized as valid only when it has reached at least 0.7 of the value of the available supply voltage $V_{CC}$ of the CMOS circuits of this example. At time $t_1$ in FIG. 2, the slave module 12 recognizes at its clock signal input 20 and therefore in its transmitter unit 22, the presence of the transmission edge of the clock signal. Slave module 12 causes receiver unit 22 to output a data value to data signal output 26 via buffer 24. As shown in FIG. 2, depending on whether the data value represents a logic 1 or a logic 0, the signal at output 26 begins to increase or to decrease. While the data value at the data signal output 26 reaches the valid value of 0.7 $V_{CC}$ (if the data value is a logic 1) or 0.3 $V_{CC}$ (if the data value is a logic 0) a time period of $\Delta T3$ will elapse. It is only as from time $t_2$ that a valid data value is present at the data signal input 28 at the receiver unit 30 of the master module 10. The transfer of the data value into the receiver unit 30 is initiated by the falling slope 34 of the clock signal, which occurs at the point in time $t_3$, but only becomes effective at the point in time $t_4$ for the above-mentioned reasons. To ensure a correct data transfer, the data value must already be present at the receiver unit 30 at during the pre-determined period time $\Delta T2$ before time $t_4$. This time period $\Delta T2$, referred to as "set-up time", is necessary to enable the reception units (normally D flip-flops) in the receiver unit 30 to reach a stable condition before the occurrence of the edge of the clock signal that initiates the transfer.

A further time period that has to be considered is the time period $\Delta T1$. Time $\Delta T1$ corresponds to the rising time of the clock signal from 0.3 $V_{CC}$ to 0.7 $V_{CC}$. This time period $\Delta T3$ must be taken into consideration in case the least favorable condition obtains, when the threshold values for the high voltage are near 0.7 $V_{CC}$ at both the master module and the slave module.

When considering the temporal interrelations described, the greatest possible bit rate can be calculated from the following formula:

$$BR_{max} = \frac{1}{2(\Delta T1 + \Delta T2 + \Delta T3)}$$

Using as an example a serial interface as embodied in the integrated circuit TMS470R1x of Texas Instruments Inc., a maximum bit rate of 7.6 Mbits/s can be obtained at both the clock signal output 16 of the master module and at the data output 26 of the slave unit, into a capacitive load of 100 pF, when the parameters $\Delta T1=37$ ns, $\Delta T2=12$ ns and $\Delta T3=17$ ns are assumed.

SUMMARY OF THE INVENTION

The invention depends on the need to provide a procedure of the type described in the foregoing, which increases the greatest bit rate.

According to the invention, this requirement is met in that, for each transfer process of a data value from one module to another module, as the clock edge initiating the import of the transmitted data value into the receiver unit of the other module, use is made of the clock edge initiating the transmission of this data value in the one module, with a time delay of one pulse repetition period of the clock signal.

When using the procedure of the invention, the temporal spacing between the transmission edge of the clock signal that initiates the transmission of a data value in a module and of the reception edge, which initiates the import of the data value into the receiver unit of the module generating the clock signal, equals one clock period. This means that the reception time of the data value N−1 coincides with the transmission time of the data value N. This means that the module that transmits the transmission edge to another module and requests this other module to transmit a data value, also uses this transmission edge as a reception edge for the data value, which it has received from the other module one pulse repetition period earlier. Using this can increase the greatest possible bit rate can be achieved.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
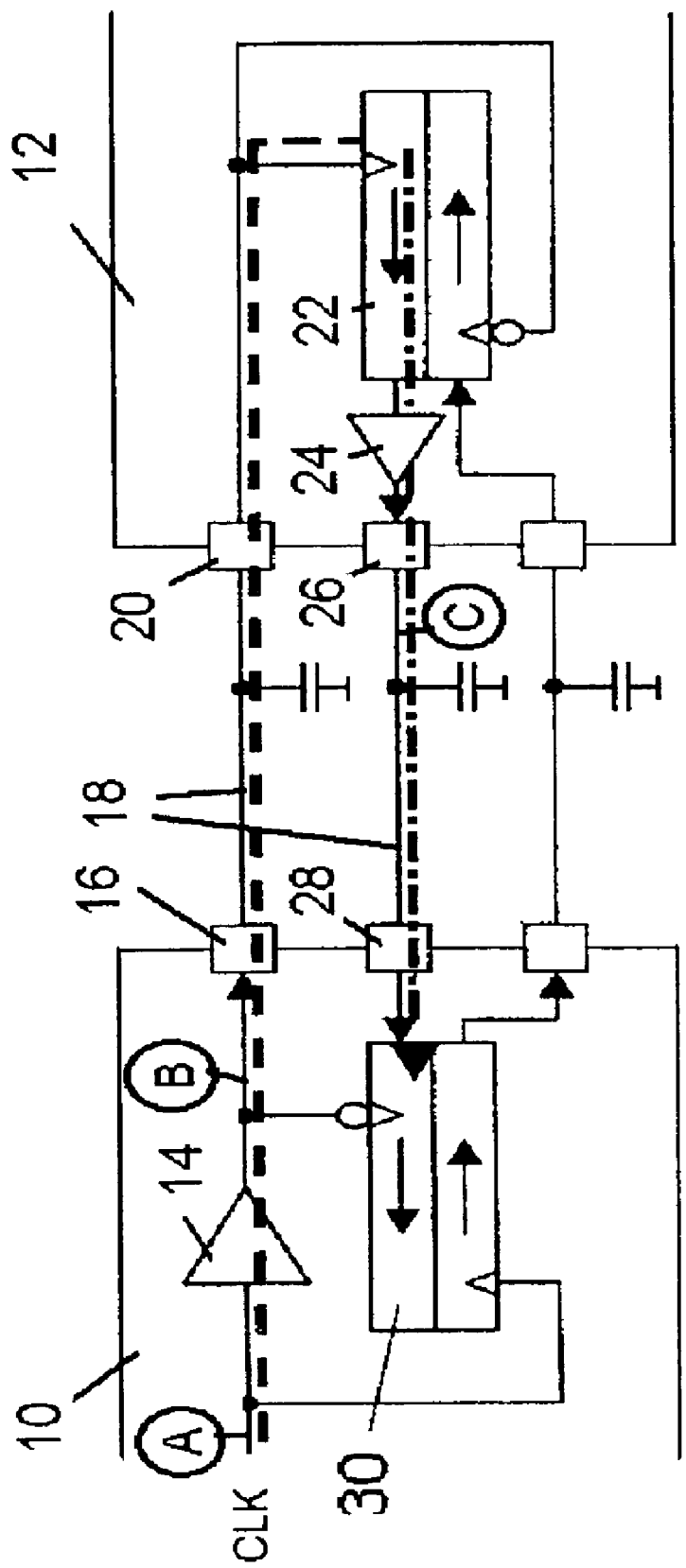
FIG. 1 is a schematic block diagram of a serial interface according to the prior art.
Figure 2:
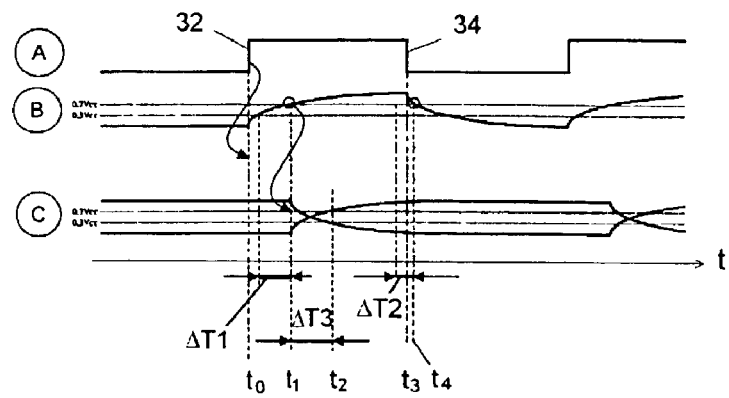
FIG. 2 is a temporal diagram to explain the method of operation of the serial interface of FIG. 1.
Figure 3:
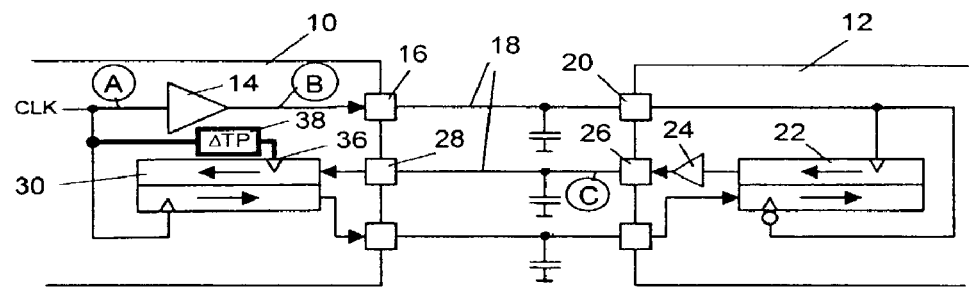
FIG. 3 is a schematic block diagram of a serial interface enabling the application of the procedure according to the invention.

The schematic block diagram of FIG. 3 uses the same reference indicators for the same components as in FIG. 1. The two block diagrams are similar to a large degree, with the exception that the clock signal input 36 of the receiver unit 30 in the master module 10 is not supplied with the clock signal from the output of buffer 14, but with the clock signal CLK after a delay of one pulse repetition period ΔTP by delay element 38. This means that simultaneously with the occurrence of a transmission edge of the clock signal CLK, a rising clock edge will also be present at the clock signal input 36 of the receiver unit 30. This rising clock edge acts as a reception edge and so initiates the import of the data value received via the data signal input 28 into the receiver unit 30.

Figure 4:
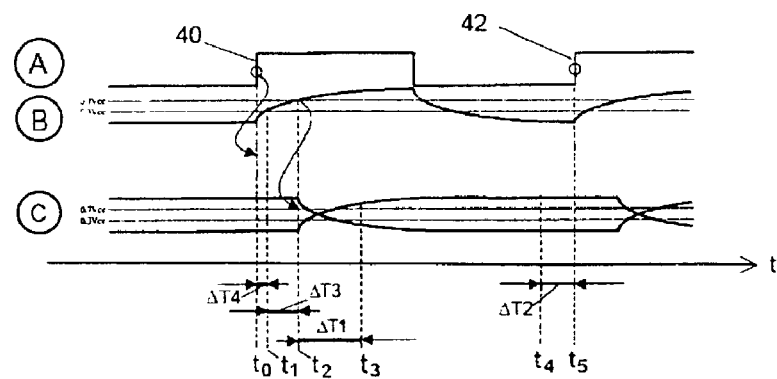
FIG. 4 is a temporal diagram to explain the method of operation of the serial interface of FIG. 3.

FIG. 4 illustrate temporal relationships of the data transfer process between the master module 10 and the slave module 12. The rising slope 40 of the clock signal CLK, (waveform A) is applied to serial data bus 18 via buffer 14 and clock signal output 16. The signal output from buffer 14 is shown at waveform B. Only when this signal has reached the value of 0.7 of the value of the available supply voltage $V_{CC}$ will slave module 12 be able to detect this rising slope of the clock signal. This initiates the output of a data value via buffer 24 and data signal output 26 to serial data bus 18 by transmitter unit 22 of slave module 12. There are two possibilities illustrated at waveforms C in FIG. 4. The data value to be applied to the bus is either a logic 1 or a logic 0. If the data value is a logic 1, then a rising signal will occur at serial data bus 18. A falling signal will occur when a logic data value 0 is to be applied. It is only the next rising slope 42 of the clock signal CLK that initiates in the master module 10 the import of the data value present at the input 28 by the receiver unit 30. At the same time, this rising slope 42 initiates in the transmitter unit 22 of the slave module 12, with a delay of $t_2$, the outputting of the next data value to the serial data bus. Each rising slope of the clock signal CLK, therefore, causes the transmission of a data value N by the slave module 12 and the reception of the data value N−1 sent one pulse repetition period in advance in the master module 10.

When appraising the greatest possible bit rate achievable, four time periods have to be considered.

$$\Delta T1 = t_3 - t_2 \quad (1)$$

This is the time period required by the slave module to recognize the clock slope, that is from the rising slope of the clock signal at clock signal input 20 until the outputs of a valid data value at data signal output 26.

$$\Delta T2 = t_5 - t_4 \quad (2)$$

This is the time period during which the data value transferred has already to be present at the data signal input 28 of master module 10 before the clock slope responsible for the initiation of the data transfer can trigger the data transfer at the rising slope of the clock signal CLK.

$$\Delta T3 = t_2 - t_1 \quad (3)$$

This time period has to be considered for the least favorable case, which occurs when the voltage threshold level for a high data value at the slave module is near 0.7 $V_{CC}$.

$$\Delta T4 = t_1 - t \quad (4)$$

This parameter defines the transfer delay time by the buffer 14 until the signal present at the clock signal output 16 reaches 30 percent of the available supply voltage $V_{CC}$.

Based upon these four time periods, the greatest achievable bit rate can be computed as follows:

$$BR_{max} = \frac{1}{2(\Delta T1 + \Delta T2 + \Delta T3 + \Delta T4)}$$

Assuming the use of a serial interface embodied, for example, by the integrated circuit TMS470R1x of Texas Instruments Inc., the following results can be achieved when applying the procedure described. This example makes the following assumptions. The capacitive loading at the clock signal output of master module 10 and the data signal output of slave module 12 is 100 pF. Thus: ΔT1=37 ns; ΔT2=12 ns; ΔT3=17 ns; and ΔT4=10 ns. These parameters yield a maximum data rate $BR_{max}$=13.2 Mbits/s.

This shows that using the procedure of this invention achieves an increase in the bit rate of around 73%. This increase can be achieved by simple means and can be realized both with existing serial interfaces, as well as with new ones to be developed. Slave modules require no modification. Since there is no need to increase the current consumption of either the data or of the clock buffers, there will be no increase of the noise emission, in spite of the higher bit rate.

What is claimed is:

1. A method for the transfer of data between a first module and a second module connected to each other by a serial data bus under the control of a clock signal, whereby each module comprises a receiver unit for the reception of the data and a transmitter unit for the transmission of data, and where the output of a data value by the transmitter unit of one module and the import of the data value into the receiver unit of the corresponding other module is initiated by clock signal slopes, comprising the steps of:

supplying the clock signal from the first module (10) to the second module (12) via a clock line;

triggering transmission of a data value (22) from the second module upon a first predetermined clock signal slope of the clock signal;

delaying at the first module (10) the clock signal that triggers the transmission of a data value from the second module (12) by one pulse repetition period; and importing the data value in the first module (10) upon a second predetermined clock slope of the delayed clock signal.

2. A serial data interface for data transmission comprising:

a serial data bus (18) connecting a first module and a second module;

a clock generator (A) disposed in said second module generating a clock signal;

a clock line (18) supplying said clock signal from said second module to said first module;

a transmitter unit (22) disposed in said first module (12) receiving said clock signal via said clock line and connected to said serial data bus, said transmitter unit (22) transmitting a bit of serial data via a serial data bus upon a predetermined clock edge of said clock signal;

a delay element (38) disposed in said second module (10) receiving said clock signal from said clock generator, said delay element (38) delaying said clock signal one pulse repetition period thereby forming a delayed clock signal; and a receiver unit (30) disposed in said second module (10) and connected to said serial data bus (18) and said delay element (38), said receiver unit (30) importing a bit of serial data from said serial data bus upon said predetermined clock edge of said delayed clock signal.

3. The serial data interface of claim 2, wherein:

said transmitter unit (22) includes a register having a serial output connected to said serial data bus.

4. The serial data interface of claim 2, wherein:

said receiver unit (30) includes a register having a serial input connected to said serial data bus.

5. The serial data interface of claim 2, wherein:

said first module (12) is a slave unit; and said second module (10) is a master unit and includes said delay element (39) and a clock generator (CLK).

* * * * *